United States Patent

Krenzer et al.

Patent Number: 5,904,455
Date of Patent: May 18, 1999

[54] DRILL WITH A DRILL POINT PART

[75] Inventors: Ulrich Krenzer, Zirndorf; Gebhard Mueller, Fuerth; Horst Jäger, Nuremberg, all of Germany

[73] Assignee: Kennametal Hertel AG, Furth, Germany

[21] Appl. No.: 08/809,839

[22] PCT Filed: Sep. 2, 1995

[86] PCT No.: PCT/EP95/03458

§ 371 Date: Apr. 2, 1997

§ 102(e) Date: Apr. 2, 1997

[87] PCT Pub. No.: WO96/11079

PCT Pub. Date: Apr. 18, 1996

[30] Foreign Application Priority Data

Oct. 7, 1994 [DE] Germany ............................. 44 35 857

[51] Int. Cl.⁶ ........................................................ B23B 51/02
[52] U.S. Cl. ........................... 408/144; 408/230; 408/233; 408/713
[58] Field of Search ................................... 408/144, 227, 408/230, 231, 199, 233, 713

[56] References Cited

U.S. PATENT DOCUMENTS

| 4,728,231 | 3/1988 | Nagatoshi et al. | 408/144 |
| 4,744,704 | 5/1988 | Galvefors | 408/713 |
| 5,154,549 | 10/1992 | Isobe et al. | 408/144 |
| 5,228,812 | 7/1993 | Noguchi et al. | 408/713 |

Primary Examiner—Daniel W. Howell
Assistant Examiner—Rouz Tabaddor
Attorney, Agent, or Firm—John J. Prizzi

[57] ABSTRACT

A drill with a drill point part that contains the drill cutter and is made of a solid hard material. The drill point part is replacably attached to the end face of a drill shaft. The drill shaft is penetrated by a shaft groove which extends in an axial direction of the shaft to accomodate the drill point part and can center the drill point part in the groove region. The drill shaft has grooves on its periphery which run in the axial direction and extend into the region of the shaft groove and continue into the region of the drill point part. The drill point part can be clamped on its side faces corresponding to and opposite the groove flanks in a force-locking manner by an insertion-clamping fit in the shaft groove.

19 Claims, 8 Drawing Sheets

DRILL WITH A DRILL POINT PART

The invention relates to a drill having the characteristics listed in the preamble to claim 1, Such a drill is disclosed in EP-B1-172 148. In this drill, the drill point part is embodied in several parts. Moreover, it is clamped by means of clamping screws penetrating the shaft groove radially.

The object of the invention is to provide a drill of the type mentioned at the beginning with a clamping device that is improved in terms of efficiency and is easier to operate. This objective is attained through clamping the drill point part on its side faces which correspond to the flanks of the groove in a force-locking manner by an insertion-clamping fit in the shaft groove owing to resilient pressure exerted by the groove flanks.

The solution is characterized by "self-grip" features. The drill point part only needs to be Inserted into the shaft groove. The dimensional relations between the clamped wall thickness of the drill point part and the distance between the two groove flanks ensure firm clamping. The drill point part is supported in the advance direction of the drill through the base of the shaft groove.

Providing an additional guide face in a radial direction between the flanks of the shaft groove and the clamping grooves which springs back in an approximately radial direction towards the outside and runs basically parallel to the drill shaft axis and forms an obtuse angle with the groove flanks, and providing counter guide faces on the drill point part corresponding to and opposite the guide faces on corresponding shoulders which shoulders protrude radially toward the outside so that the drill point part is clamped with these shoulders in a force-locking manner in addition between the counter guide faces improves the clamping. The clamping pressure introduced into the additional guide faces, together with the pressure exerted by the groove flanks, create resultant pressure, by means of which the drill point part is pressed in particular in the radially outer regions towards the flank walls of the shaft groove.

Providing a slit in the drill shaft approximately in the middle and substantially parallel to the shaft groove, and starting from the groove base in an axial direction allows for the flexible clamping pressure behavior to be adjusted. Specifically, the slit can have a depth which extends in an axial direction for adapting the springing behavior of the groove flanks or of the guide faces assigned to them.

Providing a slit in the base of the groove approximately centered and substantially parallel to the shaft groove, which slit extends substantially in the axial direction, and providing a groove base that rises on both sides starting from the groove flanks radially toward the inside, in the direction of the axial slit, and thereby forming a roof-form, and providing a base surface of the drill point part which is hollowed out with a slightly smaller ridge angle of a roof form and clamping, in particular screwing, the drill point part in an axial direction on the drill shaft in such a manner against the slit that the clamping pressure exerts an opposing clamping pressure on the flanks of the shaft groove, is a modified embodiment for attaining the objective of the invention, which is not or is less dependent on the existence of a flexible clamping pressure exerted by the groove flanks on the drill point insert. Here, the radial clamping pressure taking effect an the drill point part can be generated or supported through axial bracing of the drill point part, and for this solution, the additional guide faces described above are not required, even If they could advantageously be used in this embodiment.

Providing a positioning screw approximately concentric to the shaft axis, penetrating the shaft slit and protruding with its screw threading into the drill point part, which positioning screw is accessible for operational purposes from the rear shaft end, contains a solution for clamping the drill point part in an easily manageable manner. Further characteristics of the embodiment are described below.

The object of the invention is described in further detail in the exemplary embodiments shown in the figures. In the drawing.

In a first embodiment, the drill basically comprises a bore shaft 1 and a bore point part 3 inserted in an end face 2 thereof. Bore point part 3 is preferably of one piece and it is made of a solid hard metal. It contains a drill cutter 4. During operation, drill point part 3 is driven in the direction of rotation 5.

Drill shaft 1 is made of tool steel.

End face 2 of drill shaft 1 has a diametral shaft groove 7 of groove width 8, said shaft groove extending with its plane in axial direction 6 of shaft 1. Shaft groove 7 serves to accommodate drill point part 3. In the groove region, it contains centering means for drill point part 3, which are described below.

Drill shaft 1 bears on its periphery chip flutes or grooves 9, which basically run in an axial direction 6 and extend into the region of shaft groove 7 and continue to end face 2. In the complete drill, chip grooves 9 continue in the region of drill point part 3 in the direction of its cutter 4. Flanks 10, 11 of shaft groove 7 are aligned at least partially parallel to one another and to a shaft axis 12.

Drill point part 3 is clamped with its side faces 13, 14, corresponding and opposite to groove flanks 10, 11, in a force-locking manner by an insertion-clamping fit in shaft groove 7 owing to resilient pressure exerted by groove flanks 10, 11.

In a radial direction between flanks 10, 11 of shaft groove 7 and chip grooves 9, there is an additional guide face 15,16, springing back towards the outside in an approximately radial direction, which guide face basically runs parallel to shaft axis 12 of the drill and which forms an obtuse angle 17 with groove flanks 10, 11. On guide faces 15, 16, drill point part 3 has corresponding and opposite counter faces 18, 19 on suitably, approximately radially outwards protruding shoulders 20, 21. Drill point part 3 is clamped with these shoulders 20, 21 In a force-locking manner In addition between the opposite faces 18, 19. Obtuse angle 17 measures approximately 150°–160°.

Drill shaft 1 is slit approximately in the center parallel to shaft groove 7 and starting from a groove base 22 in axial direction 6 (slit 23). The depth of slit 23 measured in axial direction 6 serves to determine the springing behavior of groove flanks 10, 11, directed radially towards the inside, or of guide faces 15, 16 associated with them. Base 22 of shaft groove 7 runs approximately perpendicular to shaft axis 12. Drill point part 3 is supported with its correspondingly level base surface 24 on groove base 22.

If the region of groove flanks 10, 11 or of guide surfaces 15, 16, facing groove base 22 in the drawings, has a slightly convergent orientation in the direction of the groove base 22, this does not oppose the parallelism of groove flanks 10, 11 and guide faces 15, 16 to each other and to shaft axis 12, nor the corresponding orientation of the opposite surfaces on the drill point part 3. This convergent orientation serves to ease insertion of drill point part 3.

Figure 1:
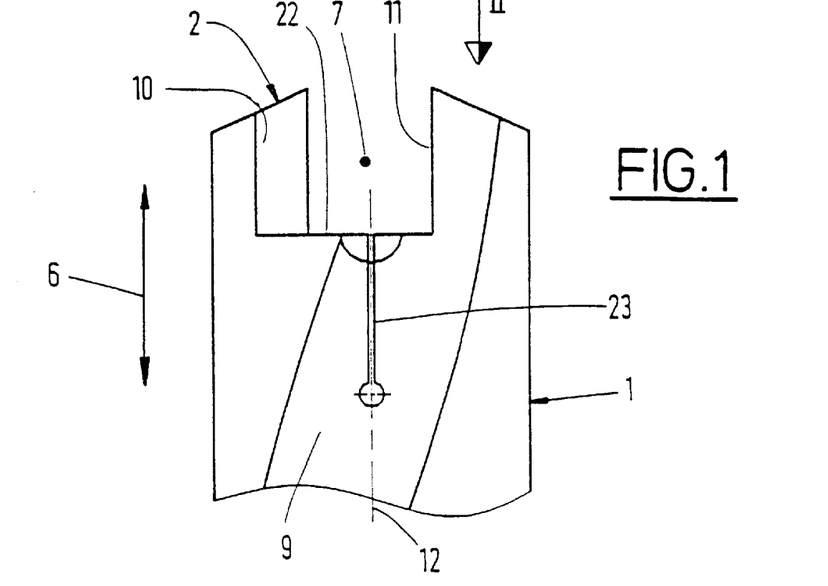
FIG. 1 shows a side view of the drill shaft of a first embodiment.
Figure 2:
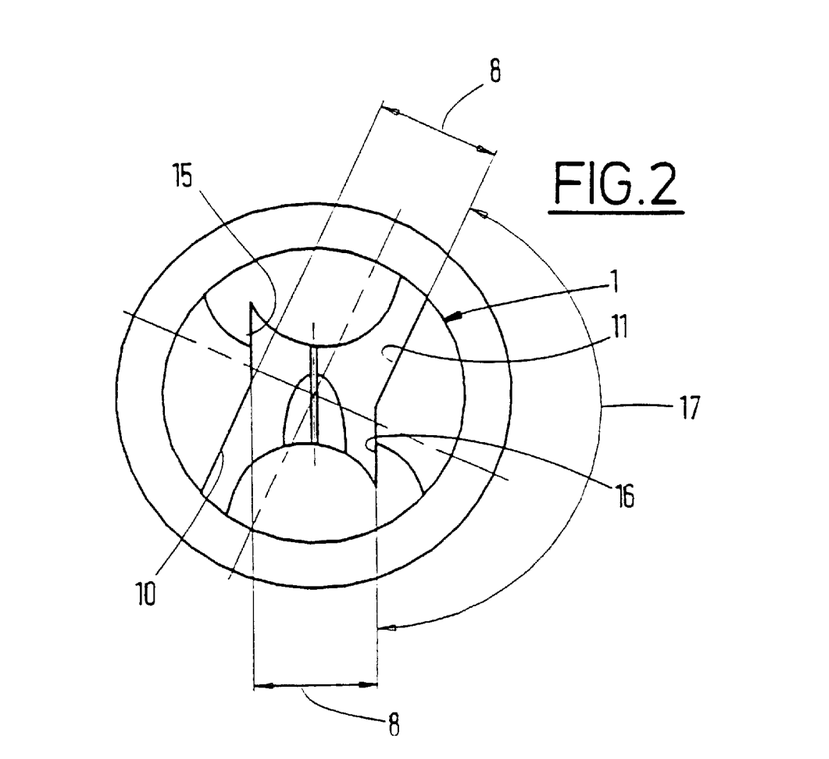
FIG. 2 shows a top view in the direction II from FIG. 1.
Figure 3:
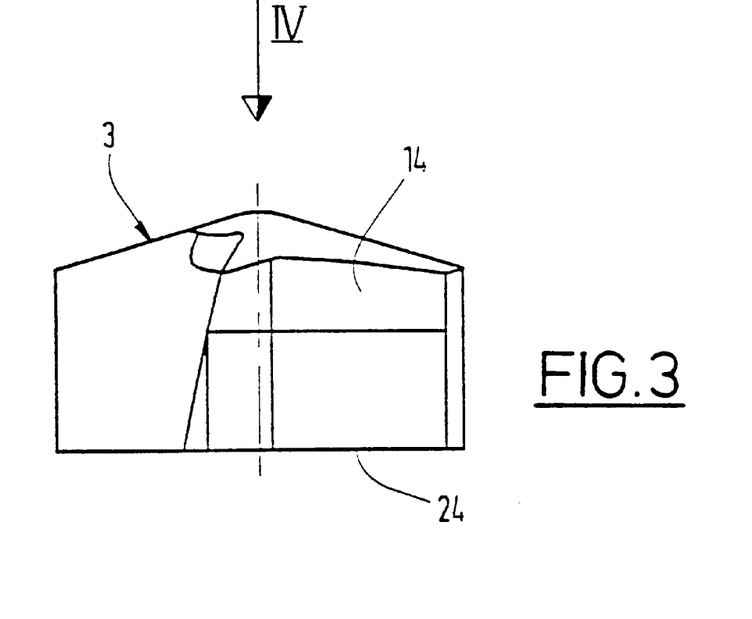
FIG. 3 shows the side view of a drill point part suitable for insertion into the drill shaft in accordance with FIGS. 1 and 2.
Figure 4:
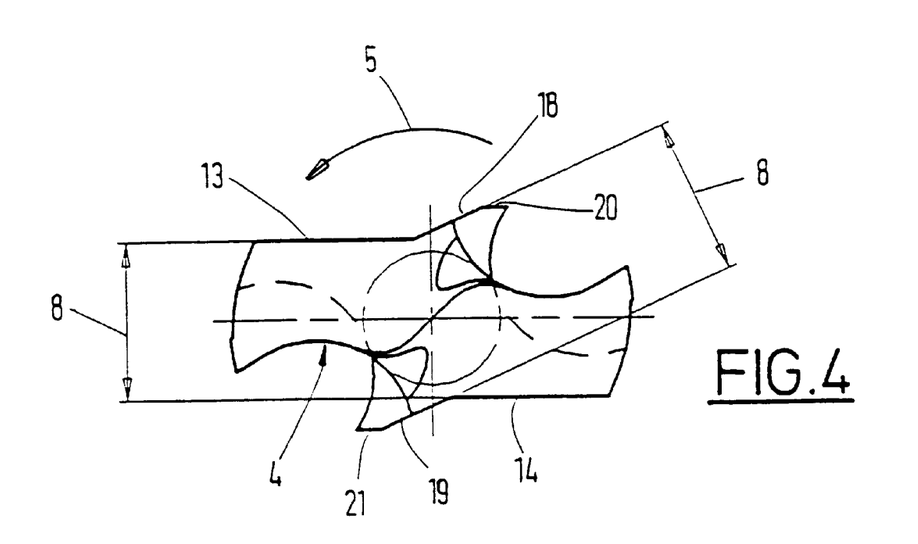
FIG. 4 shows a top view in accordance with Arrow IV in FIG. 3.
Figure 5:
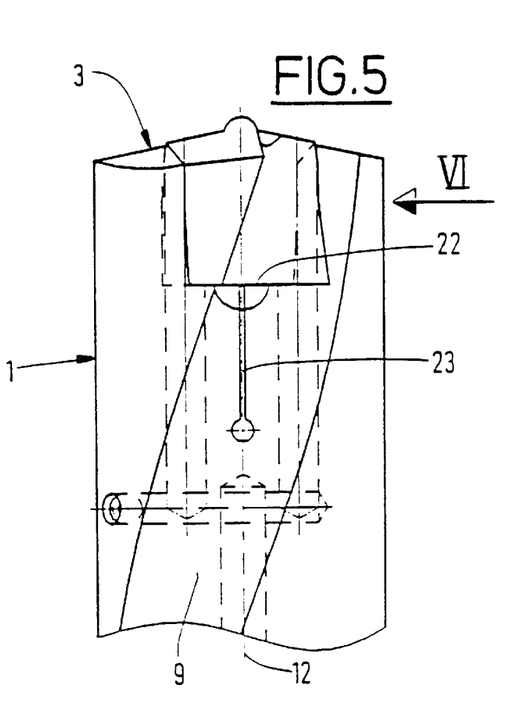
FIG. 5 shows the side view of a complete drill having an inserted drill point part corresponding to the view in FIG. 1.
Figure 6:
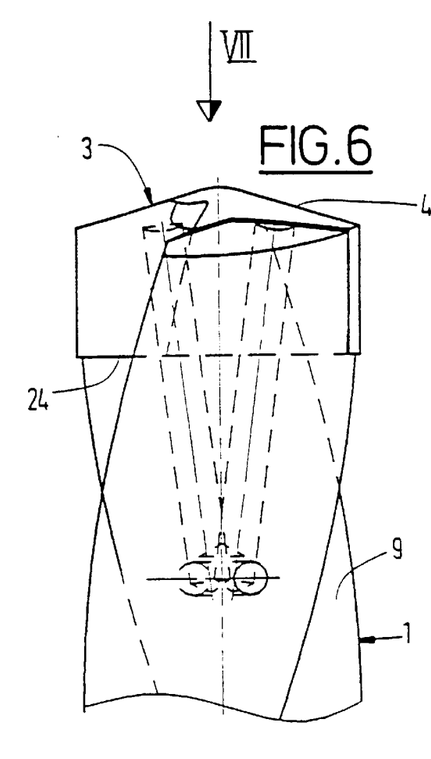
FIG. 6 shows a side view in accordance with Arrow VI in FIG. 5.
Figure 7:
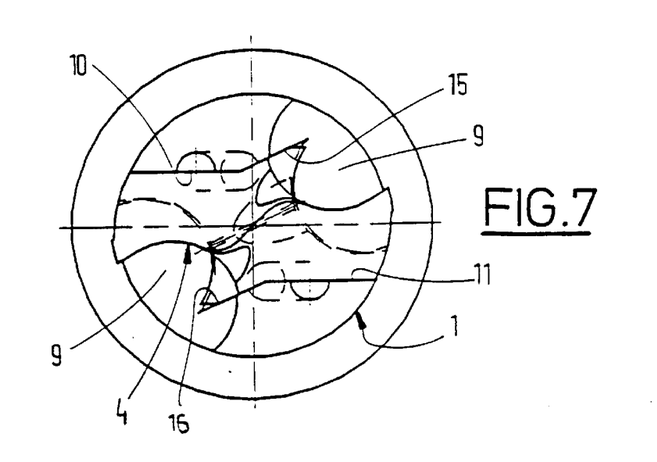
FIG. 7 shows a top view in accordance with Arrow VII in FIG. 6.
Figures 8, 9, 10:
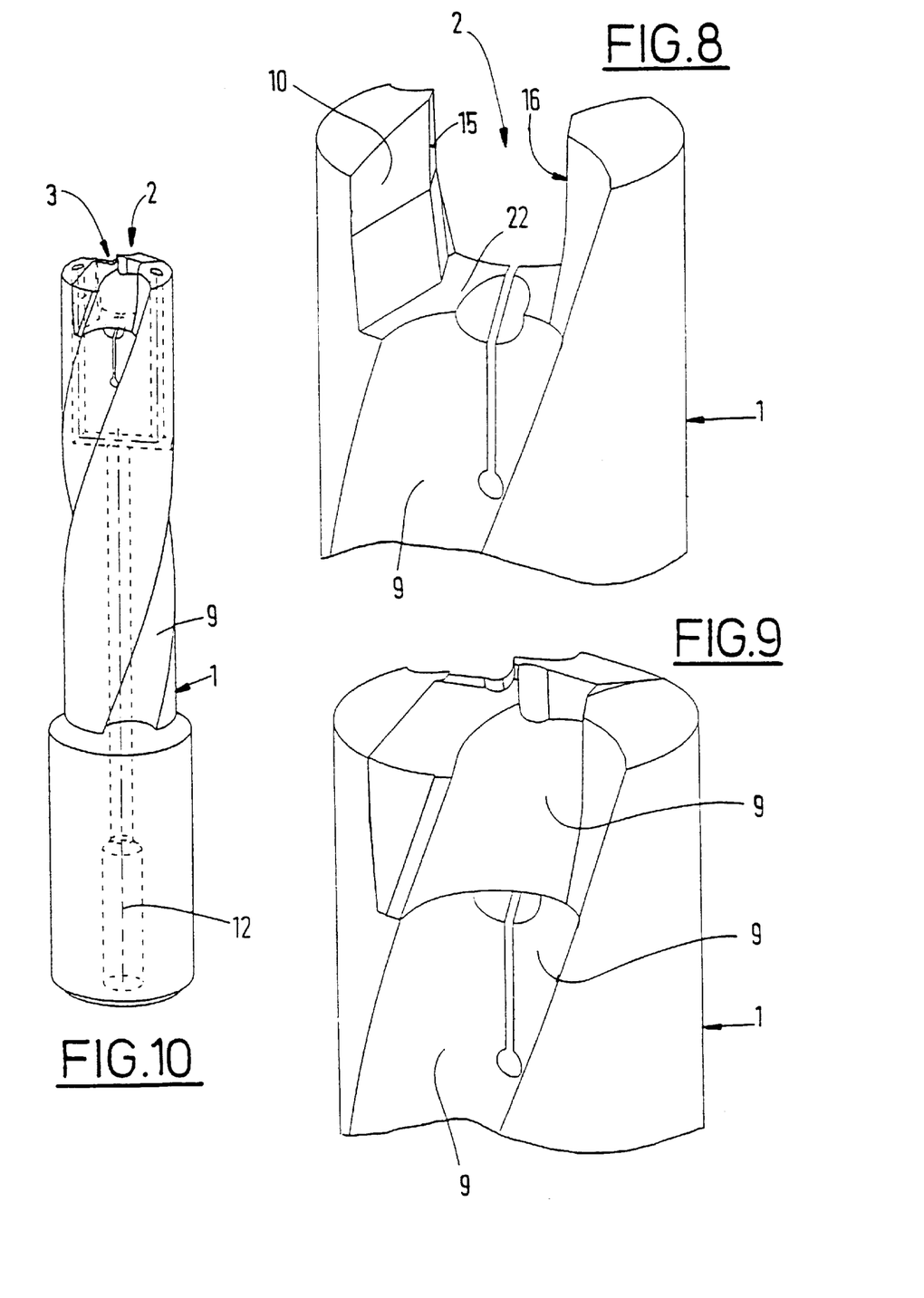
FIG. 8 shows a perspective view of the drill-point-side end of the drill shaft.
FIG. 9 shows a view corresponding to FIG. 8 of the complete drill with an inserted drill point part.
FIG. 10 shows the perspective view of a complete drill of the first embodiment in a perspective view.
Figure 11:
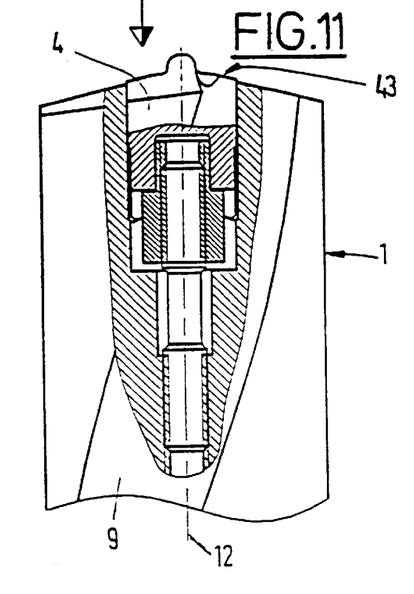
FIG. 11 shows the side view—partially in cross-section—of a second embodiment of a drill in accordance with the invention.
Figure 12:
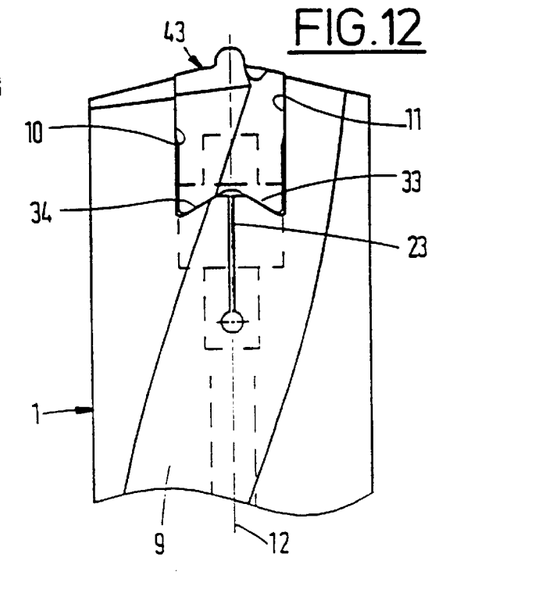
FIG. 12 shows a side view corresponding to FIG. 11 without a partial section.
Figure 13:
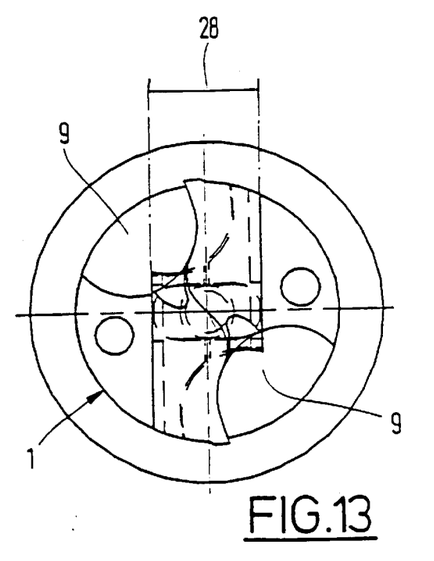
FIG. 13 shows a top view In accordance with Arrow XIII in FIG. 11.
Figure 14:
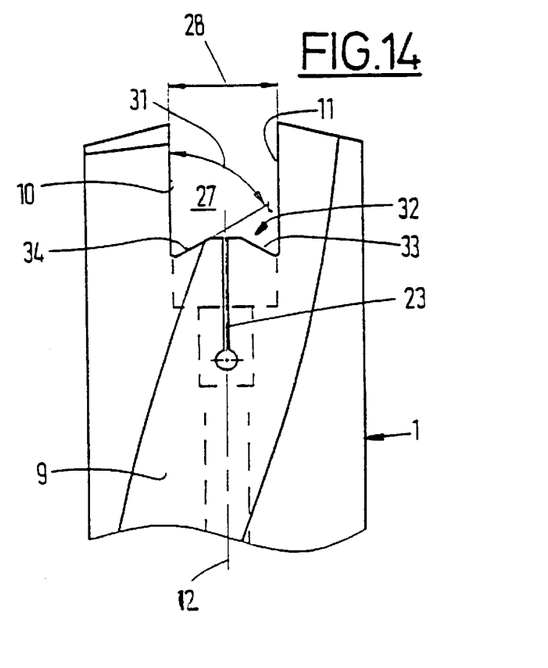
FIG. 14 shows the side view of a shaft without an inserted drill point part corresponding to FIG. 12.
Figure 15:
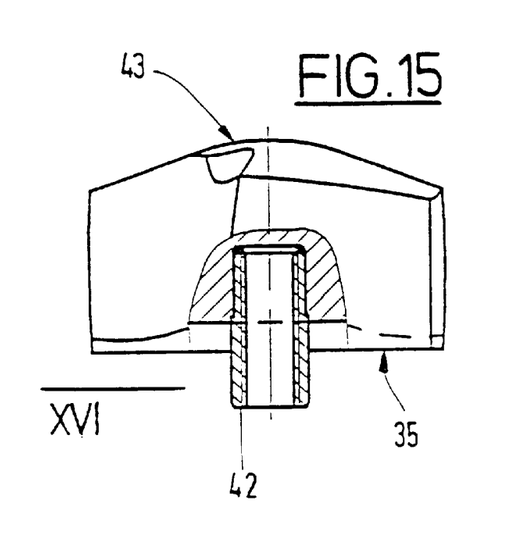
FIG. 15 shows the side view of a drill point part for the second embodiment, partially in cross-section.
Figure 16:
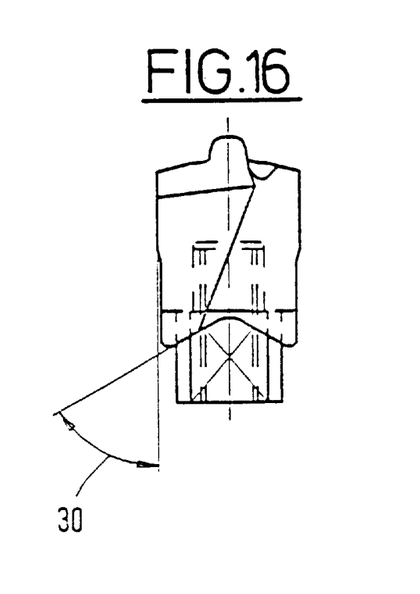
FIG. 16 shows a side view in the direction of Arrow XVI from FIG. 15.
Figure 17:
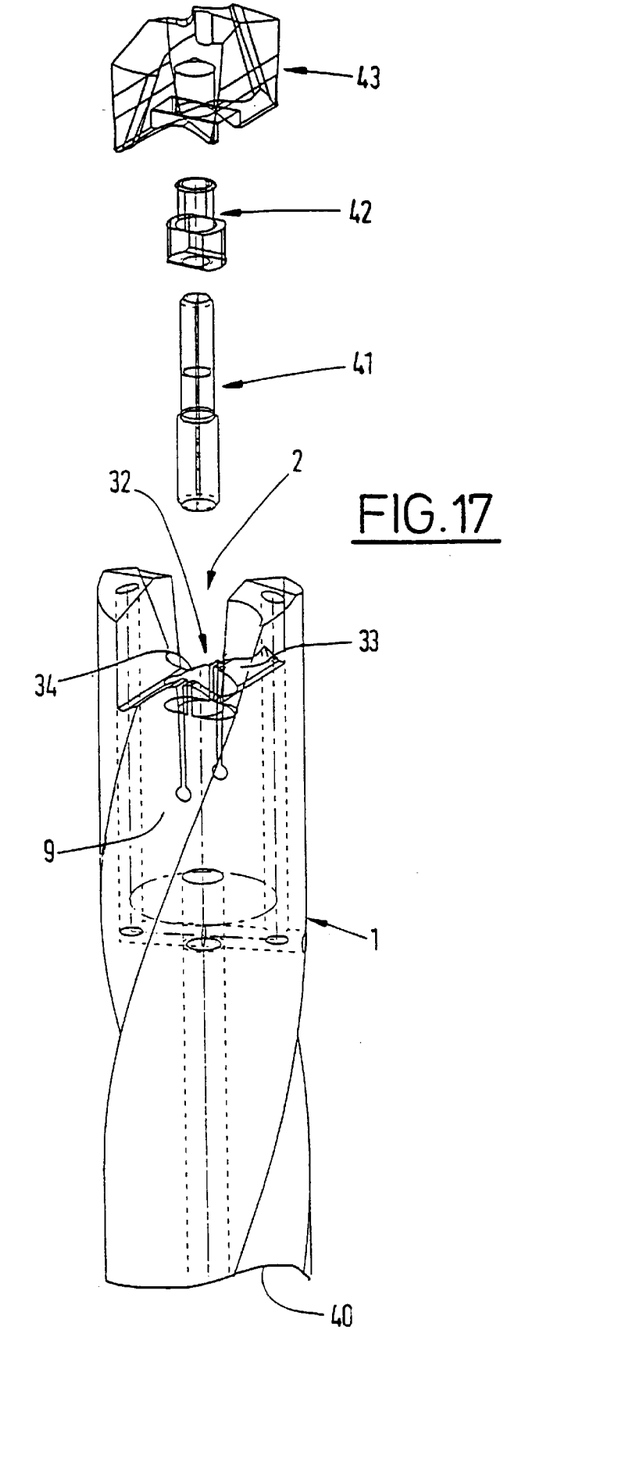
FIG. 17 shows an exploded view of the complete second embodiment.
Figure 18:
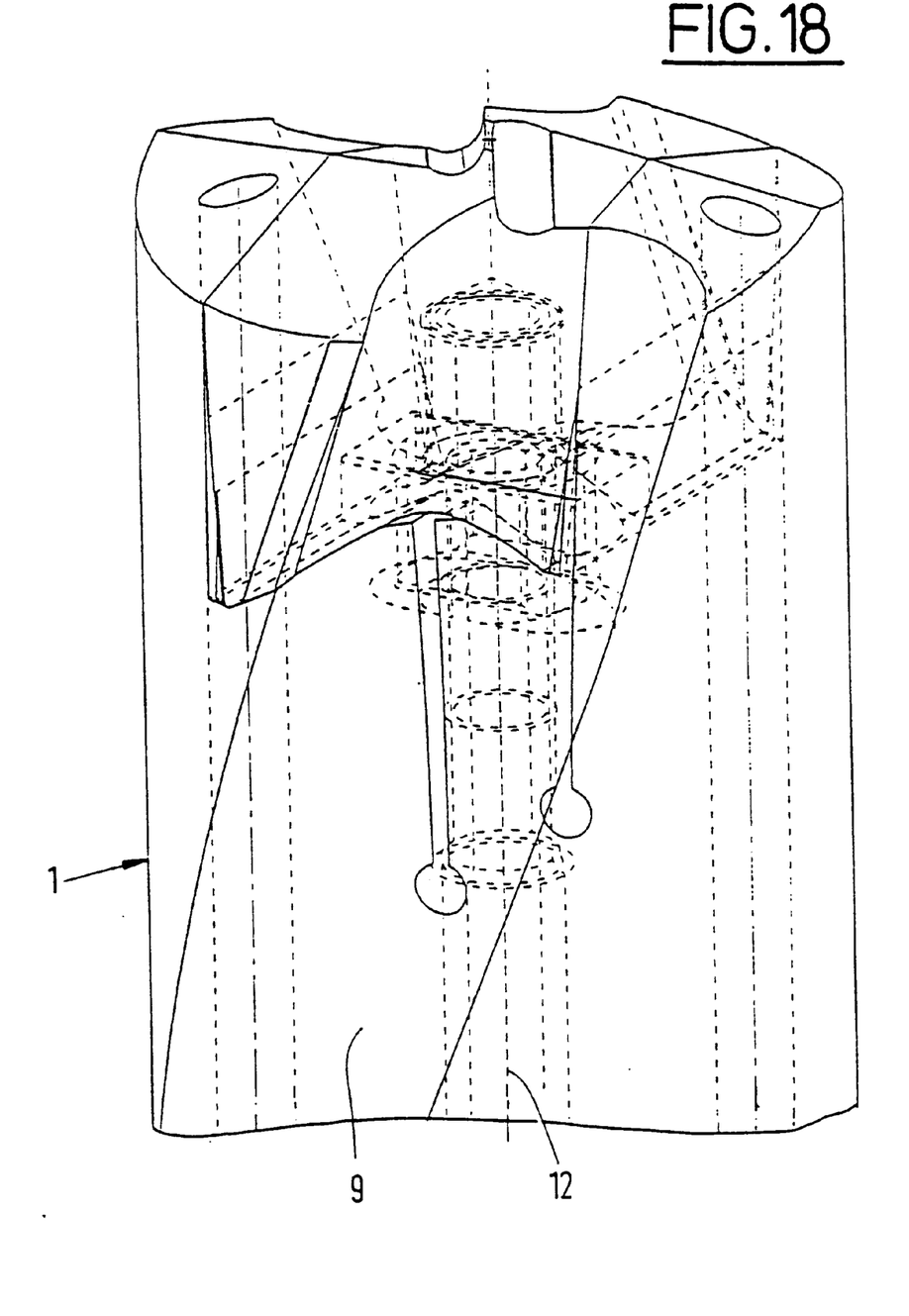
FIG. 18 shows a perspective view of the complete drill of the second embodiment.

In the second embodiment in accordance with FIG. 11 ff, shaft groove 7 with a groove width 28 has a configuration corresponding to shaft groove 7 in the first embodiment. The groove here is referenced 27. In this embodiment too, drill shaft 1 is slit approximately in the center parallel to shaft groove 27 and starting from the groove base in axial direction 6 (slit 23). In this embodiment, groove base 32 rises from groove flanks 10, 11, radially towards the inside, in the direction of axial slit 23 on both sides and thereby forms a roof form with base part surfaces 33, 34. Base surface 35 of drill point part 43 is hollowed out, in accordance with the roof form of groove base 32, with a slightly smaller edge angle 30 than roof slope angle 31 of groove base 32.

Drill point part 43 is braced, in particular screwed, in an axial direction 6 against groove bass 32 such that the clamping pressure exerts a mutually opposing clamping pressure on flanks 10, 11 of shaft groove 27. The drill point part is clamped with a positioning screw 41, being approximately concentric to shaft axis 12, penetrating shaft slit 23 and protruding with its threading into drill point part 43, and being accessible for operation from the lower or rear shaft end 40. It can be embodied as a carriage bolt. A threading holder 42 is included in a positive or non-positive manner in drill point part 43, because direct molding of a fastening threading in a hard metal part can be problematic. In the exemplary embodiment, threading holder 42 is embodied as an axial shoulder of drill point part 43, mortisable in groove base 32, and serves as a radial centering part for drill point part 43. Positioning screw 41 can also serve as such a fastening part.

| Reference List | | | |
|---|---|---|---|
| 1 | drill shaft | 22 | groove base |
| 2 | end face | 23 | slit |
| 3 | drill point part | 24 | base surface |
| 4 | drill cutter | 25 | |
| 5 | direction of rotation | 26 | |
| 6 | axial direction | 27 | shaft groove |
| 7 | shaft groove | 28 | groove width |
| 8 | groove width | 29 | |
| 9 | clamping groove | 30 | ridge angle |
| 10 | groove flank | 31 | roof slope angle |
| 11 | groove flank | 32 | groove base |
| 12 | shaft axis | 33 | base part surface |
| 13 | side face | 34 | base part surface |
| 14 | side face | 35 | base surface |
| 15 | guide face | 37 | |
| 16 | guide face | 38 | |
| 17 | obtuse angle | 39 | |
| 18 | opposite guide face | 40 | shaft end |
| 19 | opposite guide face | 41 | positioning screw |
| 20 | shoulder | 42 | threading holder |
| 21 | shoulder | 43 | drill point part |

We claim:

1. A drill comprising:

a drill point part;

a drill shaft;

said drill shaft comprising chip grooves to permit chips made by said drill to be removed from a cutting area, said chip grooves being disposed on the periphery of said drill shaft;

said drill shaft comprising an end;

said end of said drill shaft comprising a groove;

said groove being disposed and configured to accomodate said drill point part;

said drill point part comprising:
   a drill cutter; and
   said drill point part being replaceably attachable to said end of said drill shaft;

said groove comprising two flanks;

said flanks of said groove each comprising first and second sections, each of said first and second sections comprising a substantial portion of said flanks;

said drill point part comprising side faces;

said drill point part being configured to be disposed in said groove with said side faces of said drill point part being disposed opposite said flanks of said groove;

said drill point part being configured to be held in said groove in a force-locking manner by an insertion-clamping fit by said groove owing to resilient pressure exerted by said flanks of said groove;

said first section of at least one of said flanks defining a first plane disposed to lie through a plurality of points of the surface of said first section;

said second section of said at least one of said flanks defining a second plane disposed to lie through a plurality of points of the surface of said second section; and said first and second sections being disposed and configured such that the first plane and the second plane are disposed at a substantial angle one with respect to the other.

2. The drill according to claim 1 wherein:

said first section of each of said flanks of said groove are disposed substantially parallel to one another;

said second section of each of said flanks extending substantially radially toward the outside; and said second section of said each of said flanks are disposed substantially parallel to one another.

3. The drill according to claim 2 wherein:

said drill point part comprises a solid hard metal;

said drill shaft comprises tool steel;

said chip grooves are disposed substantially axially on the periphery of said drill shaft; and said chip grooves being disposed to extend into the area of said drill point part to said drill cutter.

4. The drill according to claim 3 wherein:

said shaft groove is configured to center said drill point part in said groove; and said groove extends in an axial direction of the drill shaft.

5. The drill according to claim 4 wherein:

said second section of each of said flanks extends substantially toward said chip grooves;

each of said side faces of said drill point part has a first portion and a second portion;

said second portion of each of said side faces of said drill point part being disposed opposite said second sections of said flanks of said groove;

said drill point part comprises first and second shoulders protruding radially toward the outside;

said second portion of each of said side faces being disposed on a corresponding one of said first and second shoulders; and said drill point part is clamped with said shoulders in a force-locking manner in addition between said second portions of each of said side faces of said drill point part.

6. The drill according to claim 5 wherein:

said drill shaft has a central axis;

said second sections of said flanks being disposed substantially parallel to the central axis of said drill shaft; and each said second section of said flanks of said groove forms an obtuse angle with a corresponding first section of said flanks of said groove.

7. The drill according to claim 6 wherein each said obtuse angle measures approximately 150°–160°.

8. The drill according to claim 7 wherein:

said groove comprises a base disposed between said flanks of said shaft;

said drill shaft comprises a slit, said slit being disposed substantially along the central axis of said drill shaft;

said slit extends from said base in an axial direction; and said slit being disposed substantially parallel to said first sections of said flanks of said groove.

9. The drill according to claim 8 wherein:

said slit extends a determined distance in the axial direction; and said determined distance being configured to optimize the springing behavior of said first sections of said flanks of said groove to clamp said drill point part.

10. The drill according to claim 9 wherein:

said base is disposed substantially perpendicular to the central axis of said groove;

said base comprises a substantially flat surface;

said drill point part comprises a substantially flat base surface; and said substantially flat surface of said base is disposed and configured to support said substantially flat base surface of said drill point part.

11. A drill comprising:

a drill point part;

a drill shaft;

said drill shaft comprising chip grooves to permit chips made by said drill to be removed from a cutting area, said chip grooves being disposed on the periphery of said drill shaft;

said drill shaft comprising an end;

said end of said drill shaft comprising a groove;

said groove being disposed and configured to accomodate said drill point part;

said drill point part comprising:
  a drill cutter; and
  said drill point part being replaceably attached to said end of said drill shaft;

said groove comprising two flanks;

at least a portion of said flanks of said groove being disposed substantially parallel to one another;

said drill point part comprising side faces;

said drill point part being configured to be disposed in said groove with said side faces of said drill point part being disposed opposite said flanks of said groove;

said drill point part being configured to be held in said groove in a force-locking manner by an insertion-clamping fit by said groove owing to resilient pressure exerted by said flanks of said groove;

said groove comprising a base between said flanks;

said groove comprising a slit;

said base of said groove comprising a surface, said surface of said base being disposed to rise on both sides at a first angle from said flanks of said groove towards the inside in the direction of said slit;

said drill point part comprising a base surface between said side faces;

said base surface of said drill point part receding from said side faces towards the inside of said drill point part at a second angle relative to said side faces;

said second angle being smaller than said first angle; and said drill point part being clamped in the axial direction on said drill shaft in such a manner against said axial slit that the clamping pressure of said drill point part on said drill shaft exerts a clamping pressure on said flanks of said groove.

12. The drill according to claim 11 wherein:

said surface of said groove base forms a roof-form; and said base surface of said drill point part forms a roof-form.

13. The drill according to claim 12 wherein:

said drill shaft comprises tool steel;

said drill cutter comprises a solid hard metal;

said groove is configured to center said drill point part in said groove;

said groove extends substantially in an axial direction of the drill shaft; and said slit is disposed substantially parallel to said at least a portion of said flanks of said groove.

14. The drill according to claim 13 wherein:

said chip grooves are disposed to extend into the area of said drill point part to said drill cutter; and said chip grooves are disposed substantially axially on the periphery of said drill shaft.

15. The drill according to claim 14 comprising:

a positioning screw;

said drill shaft having a central axis substantially parallel to the length of said drill shaft;

said positioning screw being disposed substantially concentric to the central axis of said drill shaft;

a first portion of said positioning screw being disposed through said slit;

a second portion of said positioning screw being threadingly engaged with said drill point part;

said drill shaft comprising a rear shaft end; and said positioning screw being accessible for operational purposes from said rear shaft end.

16. The drill according to claim 15 wherein said positioning screw comprises a tension screw.

17. The drill according to claim 16 comprising:

a threading holder; and said threading holder being inserted in said drill point part.

18. The drill according to claim 16 comprising an axial shoulder, mortisable in the groove base on the drill point part as a centering element.

19. The drill according to claim 17 wherein said threading holder is disposed and configured to center said drill point part.

* * * * *